(12) United States Patent
Nikko et al.

(10) Patent No.: US 9,141,357 B2
(45) Date of Patent: Sep. 22, 2015

(54) COMPUTER-READABLE RECORDING MEDIUM, COMPILING METHOD, AND INFORMATION PROCESSING APPARATUS

(71) Applicant: FUJITSU LIMITED, Kawasaki-shi, Kanagawa (JP)

(72) Inventors: Tomoko Nikko, Numazu (JP); Shuichi Chiba, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/255,236

(22) Filed: Apr. 17, 2014

(65) Prior Publication Data

US 2014/0344795 A1 Nov. 20, 2014

(30) Foreign Application Priority Data

May 17, 2013 (JP) .................................. 2013-105537

(51) Int. Cl.
*G06F 9/445* (2006.01)
*G06F 9/45* (2006.01)

(52) U.S. Cl.
CPC ....................................... *G06F 8/443* (2013.01)

(58) Field of Classification Search
None
See application file for complete search history.

(56) References Cited

U.S. PATENT DOCUMENTS

| 5,774,727 | A | * | 6/1998 | Walsh et al. ................... 717/150 |
| 5,822,593 | A | * | 10/1998 | Lamping et al. ............... 717/161 |
| 6,041,181 | A | * | 3/2000 | Ju et al. .......................... 717/114 |
| 6,058,266 | A | * | 5/2000 | Megiddo et al. ............... 717/156 |
| 6,070,011 | A | * | 5/2000 | Liu et al. ........................ 717/160 |
| 7,805,413 | B2 | * | 9/2010 | Hosoi ............................ 707/693 |
| 2006/0048120 | A1 | * | 3/2006 | Archambault et al. ........ 717/160 |
| 2007/0089104 | A1 | * | 4/2007 | Tal ................................ 717/151 |
| 2007/0169059 | A1 | * | 7/2007 | Halambi et al. ............... 717/160 |
| 2009/0113404 | A1 | | 4/2009 | Takayama et al. |
| 2009/0307675 | A1 | * | 12/2009 | Ng et al. ........................ 717/160 |
| 2009/0328021 | A1 | * | 12/2009 | Ng et al. ........................ 717/160 |
| 2011/0047534 | A1 | * | 2/2011 | Ye et al. ........................ 717/160 |

FOREIGN PATENT DOCUMENTS

| JP | 62-035944 | 2/1987 |
| JP | 09-114675 | 5/1997 |
| JP | 2009-104422 | 5/2009 |

* cited by examiner

*Primary Examiner* — Isaac T Tecklu
(74) *Attorney, Agent, or Firm* — Fujitsu Patent Center

(57) ABSTRACT

A compiler determines executability of loop fusion, for each of a plurality of loops existing in a code to be processed, based on performance information of a system where the code to be processed is executed and based on operands and number of data transfers executed inside each of the loops. Then, the compiler executes fusion of loop processing in accordance with a determination result of executability of the loop fusion.

6 Claims, 13 Drawing Sheets

FIG.4

[LOOP FUSION OK]

```
do i = 1, 10          !LOOP 1
  do j = 1, 10
    A(j, i) = A(j, i) + 1.0
  enddo
enddo
do i = 2, 10          !LOOP 2
  do j = 2, 10
    B(j, i) = B(j, i+1) + 1.0
  enddo
enddo
do i = 1, 10          !LOOP 3
  do j = 1, 10
    B(j, i) = A(j+1, i) + 1.0
  enddo
enddo
```

[LOOP FUSION NG]

```
do i = 1, 10          !LOOP 1
  do j = 1, 10
    C(j, i) = C(j, i) + 1.0
  enddo
enddo
do i = 1, 10          !LOOP 2
  do j = 1, 10
    A(j+1, i) = A(j+1, i) + 1.0
  enddo
enddo
do i = 1, 10          !LOOP 3
  do j = 1, 10
    B(j, i) = A(j, i) + 1.0
  enddo
enddo
```

FIG.5

[LOOP FUSION OK]

```
do i = 1, 10          !LOOP 1
  do j = 1, 10
    A(j, i) = A(j, i) + 1.0
  enddo
enddo
do i = 1, 10          !LOOP 2
  do j = 1, 10
    B(j, i) = B(j, i) + 1.0
  enddo
enddo
```

[LOOP FUSION NG]

```
do i = 1, 10          !LOOP 1
  c=d*i
  do j = 1, 10
    A(j, i) = A(j, i) + 1.0
  enddo
enddo
do i = 1, 10          !LOOP 2
  do j = 1, 10
    B(j, i) = B(j, i) + 1.0
  enddo
enddo
```

FIG.9

```
do i = 1, 10      !LOOP 1
  do j = 1, 10
    A(j, i) = A(j, i) + 1.0
  enddo
enddo
do i = 2, 10      !LOOP 2
  do j = 2, 10
    B(j, i) = B(j, i) + 1.0
  enddo
enddo
do i = 1, 10      !LOOP 3
  do j = 1, 10
    C(j, i) = A(j+1, i) + 1.0
  enddo
enddo
do i = 1, 10      !LOOP 4
  do j = 1, 10
    D(j, i) = C(j-1, i) + 1.0
  enddo
enddo
do i = 2, 10      !LOOP 5
  do j = 2, 10
    E(j, i) = E(j, i) + 1.0
  enddo
enddo
```

FIG.10

| TRIGGER | LOOP FUSION TARGET LIST |
|---|---|
| 1 | 3, 4 |
| 2 | 5 |
| 3 | 4 |

| TRIGGER | LOOP FUSION TARGET LIST |
|---|---|
| 1 | 3, 4 |
| 2 | 5 |
| 3 | 4 |

| VIRTUAL LOOP | 3, 4 |
| VIRTUAL LOOP | 2, 5 |
| VIRTUAL LOOP | 1, 3, 4 |
| VIRTUAL LOOP | 1, 4 |
| VIRTUAL LOOP | 1, 3 |
| NUMBER OF DATA TRANSFERS | |
| NUMBER OF FLOATING-POINT OPERATIONS | |
| B/F VALUE | |
| NUMBER OF INSTRUCTIONS | |
| NUMBER OF STREAMS | |

FIG.12

```
Real*4 mem01, mem02, mem03
Real*8 mem04, mem05, mem06
Real*8 mem07, mem08
LOOP 1 START
     LOAD mem01 → R01
     LOAD mem02 → R02
     MULT R01 * R02 → R03
     LOAD mem03 → R04
     ADD   R03 + R04 → R05
     LOAD mem04 → R06
     LOAD mem05 → R07
     MULT R06 * R07 → R08
     LOAD mem06 → R09
     ADD   R08 + R09 → R10
     ADD   R05 + R10 → R11
     STORE R11 → mem07
     STORE R12 → mem08
LOOP 1 END

LOOP 2 START
          ⋮
LOOP 2 END

LOOP 3 START
          !NUMBER OF DATA
          ⋮  ACCESSES  10
LOOP 3 END

LOOP 4 START
          ⋮
LOOP 4 END

LOOP 5 START
          ⋮
LOOP 5 END
```

```
real*8 A
do i = 1, 10
A(i) =
A(i+10) =
A(i+20)
enddo
```

```
Label:3
LOAD (real8) memA+0   !1)
LOAD (real8) memA+80  !2)
LOAD (real8) memA+160 !3)
bneq Label3 i 10
```

FIG.16

DETERMINE!

| VIRTUAL LOOP | 1, 3 |
|---|---|
| NUMBER OF DATA TRANSFERS | 78 |
| NUMBER OF FLOATING-POINT OPERATIONS | 156 |
| B/F VALUE | 0.5 |
| NUMBER OF INSTRUCTIONS | 350 |
| NUMBER OF STREAMS | 13 |

| VIRTUAL LOOP | 1, 4 |
|---|---|
| NUMBER OF DATA TRANSFERS | 78 |
| NUMBER OF FLOATING-POINT OPERATIONS | 130 |
| B/F VALUE | 0.6 |
| NUMBER OF INSTRUCTIONS | 450 |
| NUMBER OF STREAMS | 13 |

| VIRTUAL LOOP | 3, 4 |
|---|---|
| NUMBER OF DATA TRANSFERS | 15 |
| NUMBER OF FLOATING-POINT OPERATIONS | 276 |
| B/F VALUE | 0.054 |
| NUMBER OF INSTRUCTIONS | 350 |
| NUMBER OF STREAMS | 13 |

| VIRTUAL LOOP | 2, 5 |
|---|---|
| NUMBER OF DATA TRANSFERS | 24 |
| NUMBER OF FLOATING-POINT OPERATIONS | 145 |
| B/F VALUE | 0.165 |
| NUMBER OF INSTRUCTIONS | 540 |
| NUMBER OF STREAMS | 10 |

| VIRTUAL LOOP | 1, 3, 4 |
|---|---|
| NUMBER OF DATA TRANSFERS | 83 |
| NUMBER OF FLOATING-POINT OPERATIONS | 281 |
| B/F VALUE | 0.295 |
| NUMBER OF INSTRUCTIONS | 550 |
| NUMBER OF STREAMS | 15 | ns,
COMPUTER-READABLE RECORDING MEDIUM, COMPILING METHOD, AND INFORMATION PROCESSING APPARATUS

CROSS-REFERENCE TO RELATED APPLICATION

This application is based upon and claims the benefit of priority of the prior Japanese Patent Application No. 2013-105537, filed on May 17, 2013, the entire contents of which are incorporated herein by reference.

FIELD

The embodiments discussed herein are related to a compiler and a compiling method.

BACKGROUND

A compiler generates an object code by reading and optimizing a source code described in a programming language. In the compiler, loop fusion is utilized as an optimization technique to improve data locality, reduce the cost required for repeating determination processing for loops, and speed up the execution performance. The loop fusion is executed by fusing the loops in the case where an initial value, a final value, and an incremental value of the adjacent loops are identical and dependency between the loops does not collapse when the loops are fused, thereby reducing the number of determination times for a multiple-loop processing structure existing inside a source program.

Patent Literature 1: Japanese Laid-open Patent Publication No. 09-114675
Patent Literature 2: Japanese Laid-open Patent Publication No. 62-35944
Patent Literature 3: Japanese Laid-open Patent Publication No. 2009-104422

However, there may be a problem of causing data access latency or arithmetic processing latency after the loop fusion only with the above-described conditions of loop fusion, inducing ineffective loop fusion.

For instance, even when the loops are adjacent to each other and have the identical initial values, final values, incremental values, in the case of fusing the loops having number of data accesses more than operands, the data access latency occurs, thereby not improving the performance. In the same manner, in the case of fusing the loops having the operands more than the number of data accesses, the arithmetic processing latency occurs, thereby not improving the performance.

SUMMARY

According to an aspect of the embodiments, a computer-readable recording medium stores therein a compile controlling program causing a computer to execute a compile process. The compile process includes determining executability of loop fusion, for each of a plurality of loops existing in a code to be processed, based on performance information of a system where the code to be processed is executed and based on operands and number of data transfers executed in each of the loops, and executing fusion of loop processing in accordance with a determination result on executablity of the loop fusion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating second examples in which executability of the loop fusion is determined in view of data dependence;
FIG. 5 is a diagram illustrating examples in which executability of the loop fusion is determined whether the loops are tightly nested;
FIG. 9 is a diagram illustrating an exemplary code to be processed and to be determined whether the loop fusion is executable;
FIG. 10 is a diagram illustrating an example of a loop fusion target list;
FIG. 12 is a diagram illustrating count target examples of various kinds of data;
FIG. 16 is a diagram for describing determination on executablity of the loop fusion.

DESCRIPTION OF EMBODIMENTS

Preferred embodiments will be explained with reference to accompanying drawings. Note that the present invention is not to be limited by the embodiments. Each of the embodiments can be combined as appropriate as long as there is no inconsistency.

Figure 1:
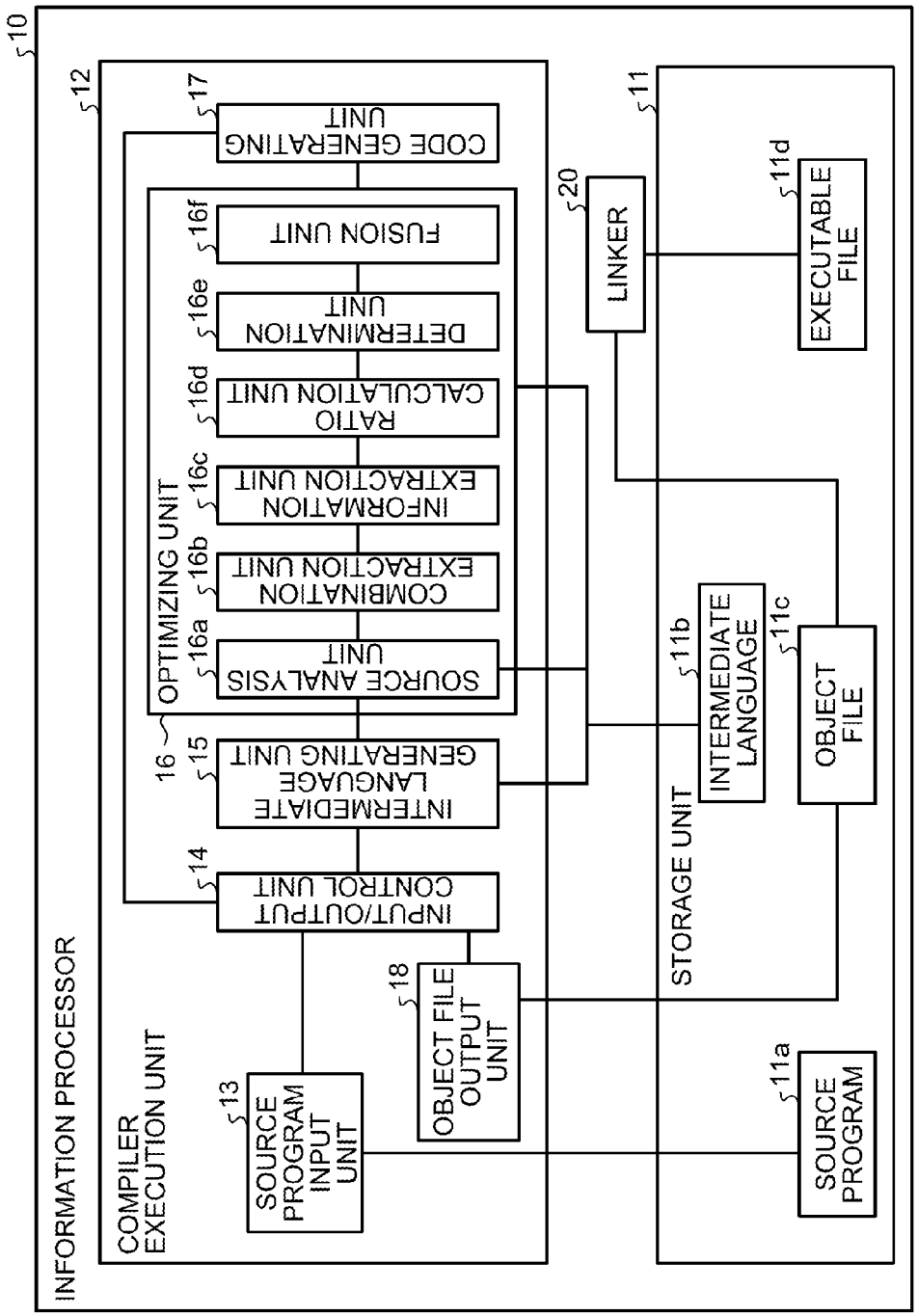
FIG. 1 is a functional block diagram illustrating a configuration of an information processor including a compiler according to a first embodiment.

[a] First Embodiment
Functional Configuration
FIG. 1 is a functional block diagram illustrating a configuration of an information processor including a compiler according to a first embodiment. An information processor 10 is a computer device that reads and optimizes a source code described in a programming language and generates an object code, and then links the object code to produce an executable file. In short, the information processor functions as a general compiler.

As illustrated in FIG. 1, the information processor 10 includes a storage unit 11, a compiler execution unit 12, and a linker 20. Note that the illustrated processing units are merely examples and may include a display unit like a display, and an input unit like a keyboard.

The storage unit 11 is a storage device that stores a source program 11a, an intermediate language 11b, an object file 11c, and an executable file 11d. Examples of the storage unit 11 are a memory, a hard disk and so on. A plurality of object codes to be processed is described in the source program 11a.

The compiler execution unit 12 compiles the source code. The compiler execution unit 12 is, for example, a compiler executed by a processor. The compiler execution unit 12 includes a source program input unit 13, an input/output control unit 14, an intermediate language generating unit 15, an optimizing unit 16, a code generating unit 17, and an object file output unit 18.

The source program input unit 13 opens a source program 11a designated by the compiler execution unit 12. For instance, the source program input unit 13 reads the source program stored in the storage unit 11 and outputs the source program to the input/output control unit 14 upon receipt of an instruction to start compiling from the compiler execution unit 12.

The input/output control unit 14 selects various kinds of processing in accordance with options and file types. For instance, when the source program 11a is received from the source program input unit 13, the input/output control unit 14 outputs the source program 11a to the intermediate language generating unit 15. Further, when an assembly language is received from the code generating unit 17, the input/output control unit 14 outputs the assembly language to the object file output unit 18.

The intermediate language generating unit 15 generates the intermediate language 11b from the source program 11a received from the input/output control unit 14, and stores the intermediate language on the memory. More specifically, the intermediate language generating unit 15 converts the source program 11a to an intermediate code utilized in the optimizing unit 16, i.e., a code to be utilized inside the compiler. Further, the intermediate language generating unit 15 stores the converted intermediate language 11b on the storage unit 11 and the like.

The optimizing unit 16 executes optimization such as loop fusion in order to speed up execution of the source program 11a. The optimizing unit 16 includes a source analysis unit 16a, a combination extraction unit 16b, an information extraction unit 16c, a ratio calculation unit 16d, a determination unit 16e, and a fusion unit 16f.

The source analysis unit 16a analyzes the intermediate language 11b. For instance, the source analysis unit 16a reads out the intermediate language 11b from the storage unit 11, and executes line reconstruction, lexical analysis, syntax analysis, meaning analysis, etc. to output results thereof to the combination extraction unit 16b.

The combination extraction unit 16b extracts a combination of the loops for which the loop fusion is executable. More specifically, the combination extraction unit 16b determines the combination for which the loop processing is fused (hereinafter may be referred to as "virtual loop") based on conditions of each of a plurality of the loops existing inside the source program 11a or in the intermediate language 11b in accordance with the analysis results by the source analysis unit 16a.

Figure 2:
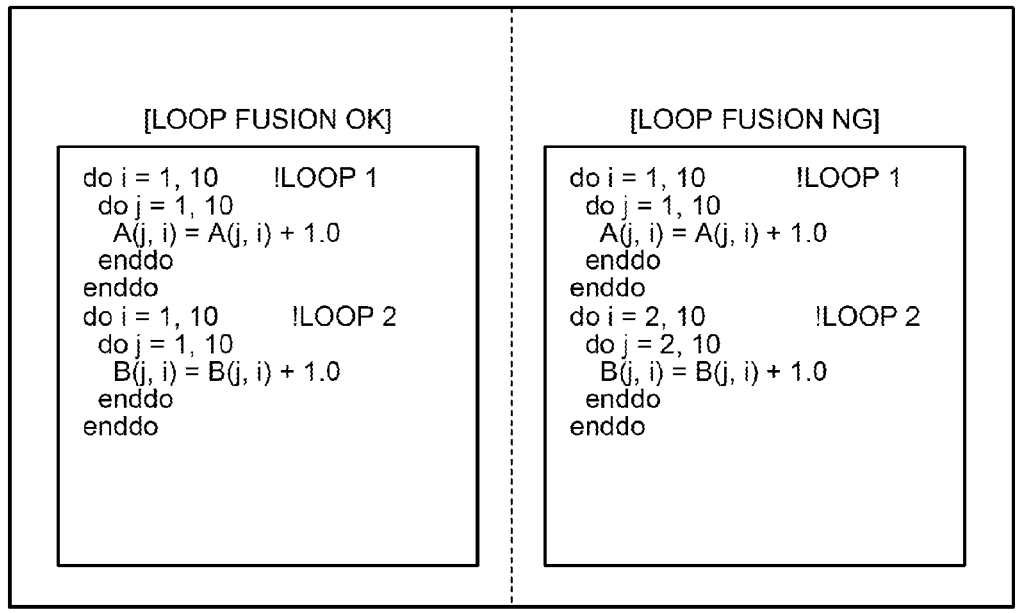
FIG. 2 is a diagram illustrating examples in which executability of loop fusion is determined in view of an initial value, a final value and an incremental value of a loop.

For instance, the combination extraction unit 16b extracts a virtual loop based on an initial value, a final value, and an incremental value of the loop. FIG. 2 is a diagram illustrating examples in which executability of loop fusion is determined in view of an initial value, a final value and an incremental value of a loop. In the case of left illustration of FIG. 2, the combination extraction unit 16b determines that the loop fusion is executable for a combination of a loop 1 and a loop 2 because both loops have the same initial value, final value and incremental value. On the other hand, in the case of right illustration of FIG. 2, the combination extraction unit 16b determines that loop fusion is not executable for the combination of the loop 1 and the loop 2 because both loops have different initial values.

Figure 3:
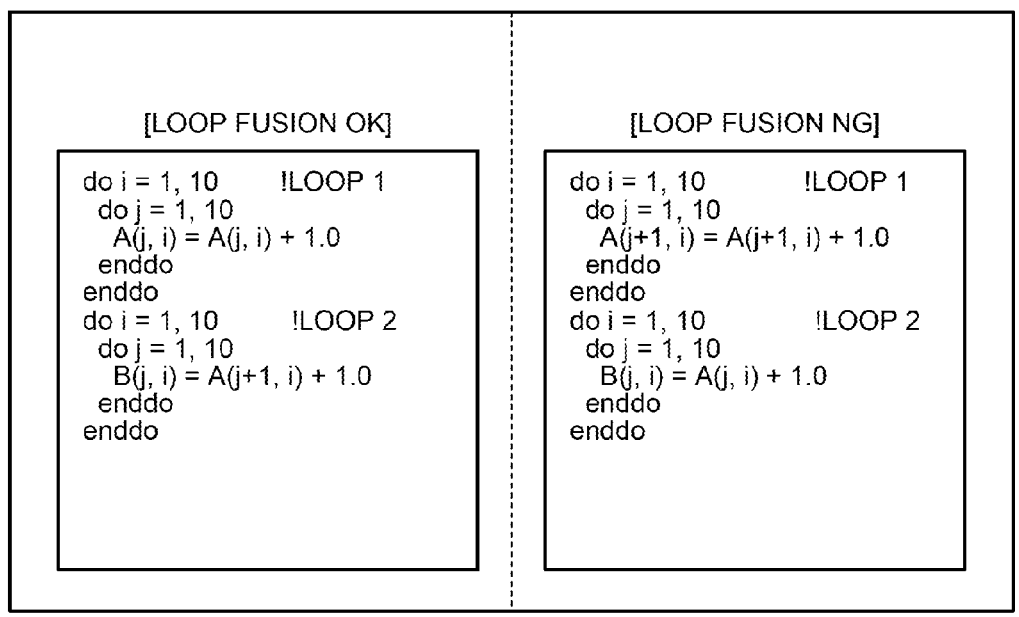
FIG. 3 is a diagram illustrating first examples in which executability of the loop fusion is determined in view of data dependence.

Additionally, the combination extraction unit 16b extracts the virtual loop based on data dependence between the loops. FIG. 3 is a diagram illustrating first examples in which executability of the loop fusion is determined in view of data dependence. In the case of left illustration of FIG. 3, A(j) and A(j+1) of a loop 1 and a loop b are dependent each other. However, the combination extraction unit 16b determines that the loop fusion is executable for the combination of the loop 1 and the loop 2 because the loops are dependent in the forward direction and it is clear that the data is not collapse even when the loops are fused. On the other hand, in the case of right illustration of FIG. 3, the combination extraction unit 16b determines that loop fusion is not executable for the combination of the loop 1 and the loop 2 because A(j+1) and A(j) are dependent but the loops are dependent in the inverse direction, and it can be determined that the data may collapse when the loops are fused.

FIG. 4 is a diagram illustrating second examples in which executability of the loop fusion is determined in view of data dependence. In the case of left illustration of FIG. 4, in the case where a loop 1 and a loop 2 are candidates for fusing, the combination extraction unit 16b determines that the loop 2 and a loop 3 do not have dependency because the loop 3 does not utilize a calculation result of the loop 2. As a result, the combination extraction unit 16b determines that the loop fusion is executable for the combination of the loop 1 and the loop 2.

On the other hand, in the case of right illustration of FIG. 4, when the loop 1 and the loop 2 are the candidates for fusing, the combination extraction unit 16b determines that the loop 2 and the loop 3 have the dependency because the loop 3 utilizes the calculation result of the loop 2. As a result, the combination extraction unit 16b determines that loop fusion is not executable for the combination of the loop 1 and the loop 2.

Further, the combination extraction unit 16b extracts the virtual loop based on whether the loops are tightly nested. More specifically, the combination extraction unit 16b determines, as a candidate combination, the loops containing an operation only in an innermost loop of a multiple-loop. In the case where any operation is contained in a halfway loop, the combination extraction unit 16b deems the loops below the loop containing the operation are tight loops, and exempts these loops from the candidate combination.

FIG. 5 is a diagram illustrating examples in which executability of the loop fusion is determined whether the loops are tightly nested. In the case of left illustration of FIG. 5, the combination extraction unit 16b determines that the loop fusion is executable for the combination of a loop 1 and a loop 2 because both the loop 1 and the loop 2 are tightly nested. On the other hand, in the case of right illustration of FIG. 5, the combination extraction unit 16b determines that the loop 2 is tightly nested but the loop 1 is not tightly nested because the loop 1 includes an arithmetic expression "c=d*1" other than the innermost loop. As a result, the combination extraction unit 16b determines that the loop fusion is not executable for the combination of the loop 1 and the loop 2.

Returning to FIG. 1, the information extraction unit 16c extracts the candidate for the loop fusion extracted by the combination extraction unit 16b, more specifically, operands, number of data transfers, number of instructions, and number of streams with respect to the virtual loop.

For instance, the information extraction unit 16c counts the number of arithmetic instructions, such as a MULT instruction and an ADD instruction, which execute floating-point operations of a resister, and calculates the operands for each of the combinations. Also, the information extraction unit 16c counts the number of cache lines in the memory which the respective loops access, and calculates the number as the number of streams for each of the combinations.

Further, the information extraction unit 16c counts the number of instructions such as a "LOAD" instruction for loading data in the register or a "STORE" instruction for storing the data in the memory for each of the combinations. Further, the information extraction unit 16c calculates the number of data transfers, i.e., the number of data accesses based on the number of the respective instructions and the number of bytes of the respective instructions to be referred. Here, note that the number of data transfers of the "STORE" instruction becomes double because the instruction is once loaded in the register and then stored in the loaded area.

The ratio calculation unit 16d calculates, for each of the combinations, a ratio of the number of data transfers to the operands by using the various kinds of data extracted by the information extraction unit 16c. More specifically, the ratio calculation unit 16d calculates the following ratio: the total number of data transfers inside the virtual loop/total number of operands inside the virtual loop=B (Byte)/F (FLOP) value. For example, in the case where the number of data transfers is "78" and the operands is "156", the ratio calculation unit 16d calculates the B/F value as "0.5".

The determination unit 16e determines whether the loop fusion is executable for each of the combinations based on the B/F value calculated by the ratio calculation unit 16d. More specifically, the determination unit 16e determines that the loop fusion is executable in the case where the B/F value of each of the combinations is in an optimum state in which arithmetic performance of the processor is fully utilized and a memory bandwidth is fully used.

For example, the determination unit 16e determines that the loop fusion is executable when the combination has a B/F value within a predetermined range. Now, a description will be given for a value to be the threshold. For example, in a computer that operates having performance specification of 16 GFLOPS, 8 core, an operand value of the floating-point operations executed per second is 16×8=128 GFLOPS. Additionally, in the case where theoretical throughput of the memory is 64 GB/s, the ideal B/F value to fully use system resources of the computer is "64/128=0.5". This value depends on the specification of a machine, and may fluctuate depending on the memory throughput and the FLOPS value. In this exemplary case, the range of the threshold is set to 0.3<B/F value<0.6 based on the ideal B/F value.

Incidentally, in the case where there are the same loops existing in a plurality of combinations determined to be executable of the loop fusion, the determination unit 16e fuses the loops corresponding to a combination having a minimum difference between the B/F value and the threshold (ideal value). Further, the determination unit 16e executes the same determination for a combination that includes other loops not involving the loops determined executable of the loop fusion.

Also, the determination unit 16e may determine executability of the loop fusion considering the number of streams and the number of instructions. For instance, when the number of streams or the number of instructions exceeds the threshold, the determination unit 16e determines that the loop fusion is not executable for a visual loop even though the virtual loop satisfies the conditions of the B/F value.

Figure 6:
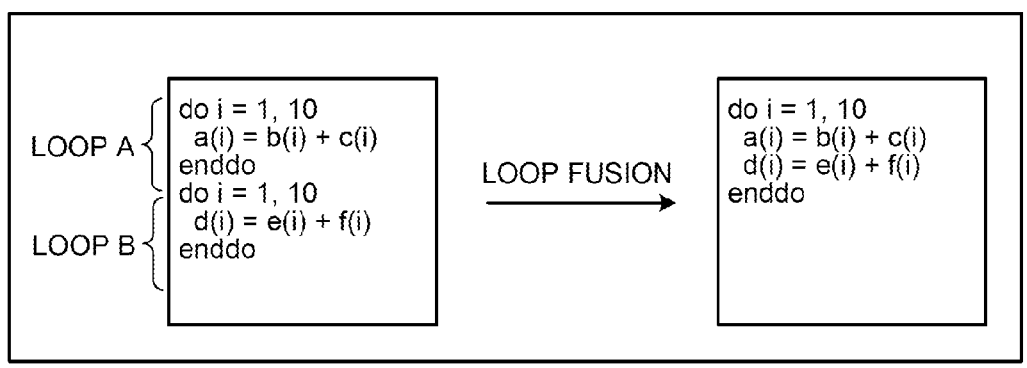
FIG. 6 is a diagram for describing an example of the loop fusion.

The fusion unit 16f fuses the loops determined to be executable of the loop fusion by the determination unit 16e. FIG. 6 is a diagram for describing an example of a loop fusion. As illustrated in FIG. 6, in the case where that a loop A and a loop B are determined to be executable of loop fusion, the fusion unit 16f inserts an arithmetic expression of the loop B next to an arithmetic expression in the loop A so that the loops are processed as one loop. This may reduce the cost for the repeated determination processing for the loops and speed up execution performance.

The code generating unit 17 generates an assembly language from the intermediate language optimized by the optimizing unit 16. Subsequently, the code generating unit 17 outputs the generated assembly language to the input/output control unit 14.

Upon receipt of the assembly language from the input/output control unit 14, the object file output unit 18 generates an object file 11c from the assembly language and stores the object file in the storage unit 11.

The linker 20 reads out the object file 11c generated by the object file output unit 18 from the storage unit 11, and generates the executable file 11d by linking the object file 11c to a library file. Subsequently, the linker 20 stores the generated executable file 11d in the storage unit 11.

Processing Flow

Next, a processing flow executed by the information processor will be described. Here, an entire flow of the loop fusion and data generation processing executed in the entire flow will be described.

Entire Flow

Figure 7:
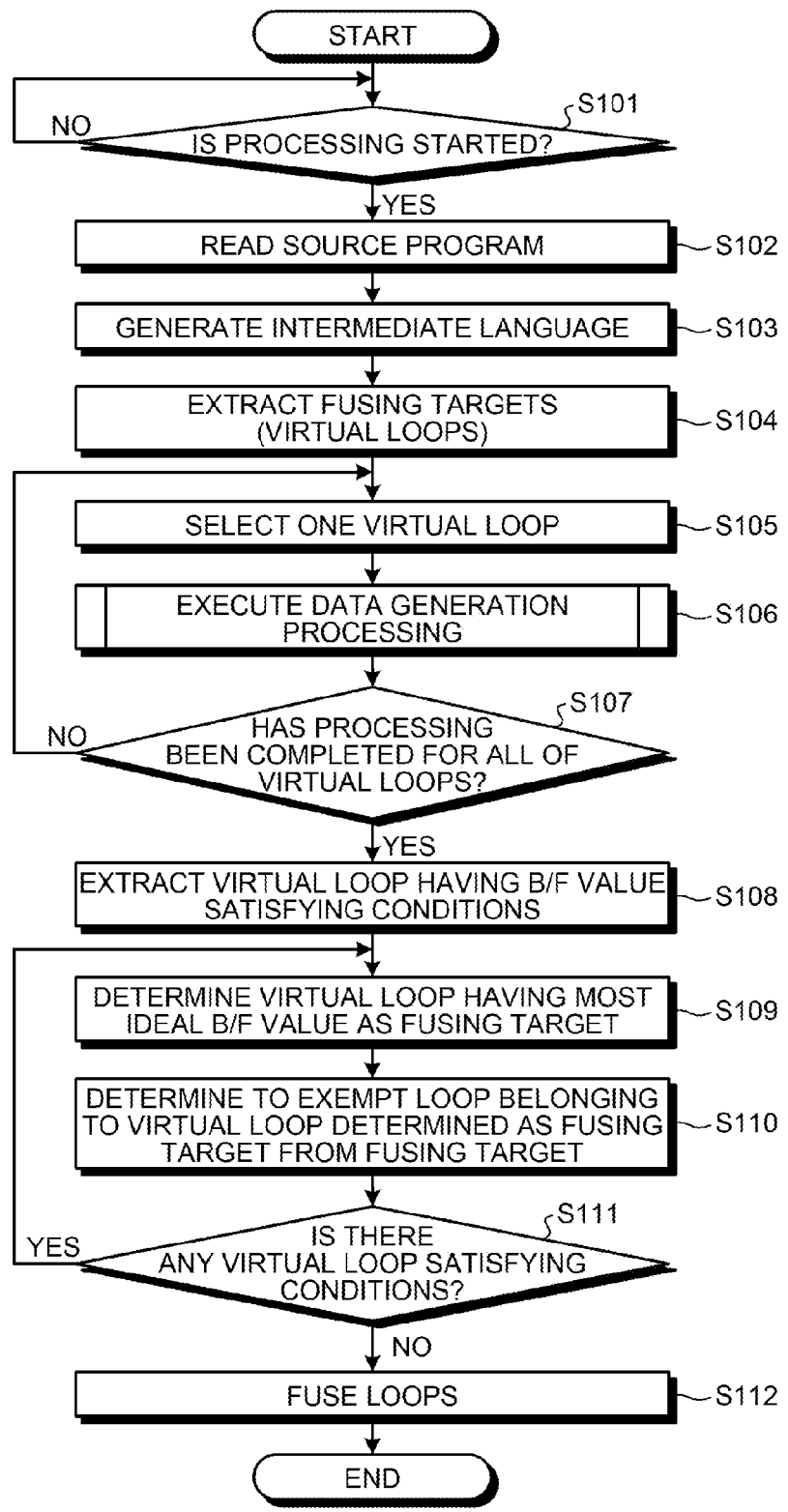
FIG. 7 is a flowchart illustrating an entire flow of the loop fusion according to the first embodiment.

FIG. 7 is a flowchart illustrating the entire flow of the loop fusion according to the first embodiment. As illustrated in FIG. 7, the source program input unit 13 reads out the source program 11a from the storage unit 11 (S102) upon start of compile processing (S101: Yes).

Subsequently, the intermediate language generating unit 15 generates the intermediate language 11b from the source program 11a that has been read out by the source program input unit 13 (S103). After that, analysis by the source analysis unit 16a is executed.

Then, the combination extraction unit 16b extracts virtual loops representing candidate combinations for the loop fusion (S104). Subsequently, the information extraction unit 16c and the ratio calculation unit 16d select one virtual loop from the extracted virtual loops (S105) and the data generation processing is executed (S106).

Further, after completing the data generation processing for the selected virtual loops, the information extraction unit 16c and the ratio calculation unit 16d determine whether the processing has been completed for all of the virtual loops (S107). Here, in the case where the processing has not been executed for any of the virtual loops (S107: No), the information extraction unit 16c and the ratio calculation unit 16d return to step S105 and repeat the processing thereafter.

On the other hand, in the case where it is determined that the processing has been completed for all of the virtual loops (S107: Yes), the determination unit 16e extracts a virtual loop having the B/F value satisfying the conditions (S108). At this point, the determination unit 16e may extract the virtual loop in light of the number of streams or the number of instructions.

Subsequently, the determination unit 16e determines, as a fusing target, the virtual loop having the B/F value closest to the ideal value among the virtual loops satisfying the conditions (S109). Then, the determination unit 16e exempts, from the fusing target, the loop belonging to the virtual loop that has been determined as the fusing target (S110). In other words, the determination unit 16e exempts, from the fusing target, other virtual loops including the loop determined to be fused.

After that, in the case of determining that there is other virtual loop satisfying the conditions (S111: Yes), the determination unit 16e returns to step S109. On the other hand, in the case where the determination unit 16e determines that there is no other virtual loop satisfying the conditions (S111: No), the fusion unit 16f fuses each of the loops belonging to the virtual loop determined as the target of loop fusion (S112). After that, general compile processing is executed.

Data Generation Processing Flow

Figure 8:
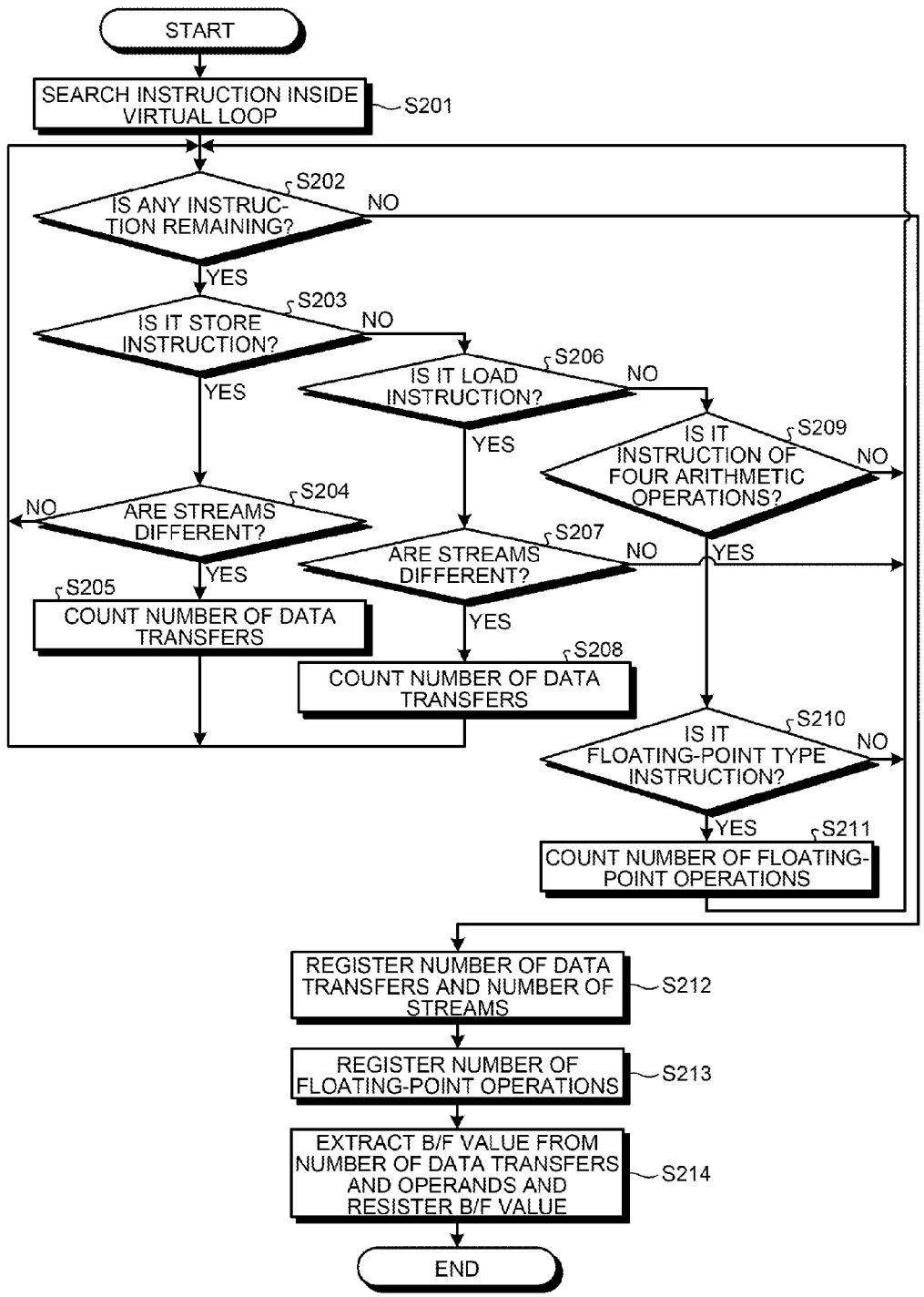
FIG. 8 is a flowchart illustrating a data generation processing flow in the loop fusion according to the first embodiment.

FIG. 8 is a flowchart illustrating a data generation processing flow in the loop fusion according to the first embodiment. The processing executed here corresponds to the processing executed in step S106 in FIG. 7.

As illustrated in FIG. 8, the information extraction unit 16c searches an instruction inside the selected virtual loop (S201), and in the case where an unsearched instruction is searched (S202: Yes), the information extraction unit 16c determines whether the searched instruction is a "STORE" instruction (S203).

Subsequently, in the case of determining that the searched instruction is the "STORE" instruction (S203: Yes), the information extraction unit 16c determines whether streams which the respective loops inside the target virtual loop access are different (S204).

Then, in the case of determining that the streams which the respective loops access are different (S204: Yes), the information extraction unit 16c counts the number of data transfers, i.e., the number of data accesses (S205), and returns to step S202 to repeat the processing thereafter. At this point, the information extraction unit 16c also counts the number of streams to be accessed inside the virtual loop. Meanwhile, in the case of determining that the streams which the respective loops access are not different (S204: No), the information extraction unit 16c returns to step S202 to repeat the processing thereafter without counting the number of data transfers.

On the other hand, in the case of determining that the searched instruction is not the "STORE" instruction in step S203 (S203: No) but is the "LOAD" instruction (S206: Yes), the information extraction unit 16c executes the processing in step S207. More specifically, the information extraction unit 16c determines whether the streams which the respective loops inside the target virtual loop access are different (S207).

Then, in the case of determining that the streams which the respective loops access are different (S207: Yes), the information extraction unit 16c counts the number of data transfers, i.e., the number of data accesses (S208) and returns to S202 to repeat the processing thereafter. At this point, the information extraction unit 16c also counts the number of streams to be accessed inside the virtual loop. Meanwhile, in the case of determining that the streams which the respective loops access are not different (S207: No), the information extraction unit 16c returns to step S202 to repeat the processing thereafter without counting the number of data transfers.

On the other hand, in the case of determining that the searched instruction is not the "LOAD" instruction in step S206 (S206: No) but is an instruction of four arithmetic operations such as ADD (S209: Yes), the information extraction unit 16c executes the processing in step S210. In other words, the information extraction unit 16c determines whether the searched instruction of four arithmetic operations is a floating-point type instruction.

Then, in the case of determining that the searched instruction of four arithmetic operations is the floating-point type instruction (S210: Yes), the information extraction unit 16c counts the operands, i.e., the number of floating-point operations (S211) and returns to step S202 to repeat the processing thereafter.

Meanwhile, in the case of determining that searched instruction of four arithmetic operations is not the floating-point type instruction (S210: No), the information extraction unit 16c returns to step S202 to repeat the processing thereafter without counting the operands.

Also, in the case of determining that the searched instruction is not the four arithmetic operations instruction (S209: No), the information extraction unit 16c returns to step S202 to repeat the processing thereafter without counting the operands.

Further, in the case where the information extraction unit 16c executes the processing in steps S203 to S211 and then determines that there is no unsearched instruction remaining in step S202 (S202: No), the information extraction unit 16c registers the number of data transfers and the number of streams calculated through steps S203 to S211, correlating to the respective virtual loops (S212).

Subsequently, the information extraction unit 16c also registers the number of floating-point operations calculated through steps S203 to S211, correlating to the information in step S212 (S213). Further, the ratio calculation unit 16d calculates a B/F value from the calculated number of data transfers and the number of floating-point operations, and registers the B/F value, correlating to the information in steps S212 and S213 (S214). Thus, the optimizing unit 16 calculates the operands, the number of data transfers, the number of instructions, the number of streams, and the B/F value for each of the virtual loops.

Concrete Example

Next, a concrete example of the above loop fusion will be described. FIG. 9 is a diagram illustrating an exemplary code to be processed and to be determined whether the loop fusion is executable. As illustrated in FIG. 9, a source code to be determined whether executable of the loop fusion includes five loops: from a loop 1 to a loop 5. In the following, which combination among the five loops of the loop 1 to the loop 5 is to be determined as the most optimized for the loop fusion will be described.

Extracting Combination

First, the combination extraction unit 16b extracts candidate combinations for the loop fusion, i.e., virtual loops, from the intermediate language of the source code illustrated in FIG. 9 generated by the intermediate language generating unit 15. In the case of FIG. 9, the combination extraction unit 16b extracts the candidate combinations, using the loop 1 as a trigger, and then extracts the candidate combinations, using the loop 2, the loop 3, the loop 4, and the loop 5 as the trigger in order.

First, the loop 1 is used as the trigger. For instance, the combination extraction unit 16b determines that the loop 1 and the loop 2 are not combinable because these loops have the different initial values.

Subsequently, the combination extraction unit 16b determines that the loop 1 and the loop 3 are combinable because these loops have the same initial value, final value and incremental value and also A(j) and A(j+1) are dependent in the forward direction, and further the loop 2 and the loop 3 do not have the dependency. Also, the combination extraction unit 16b determines that the loop 1 and the loop 4 are combinable because these loops have the same initial value, final value and incremental value, and the loop 4 is dependent on the data of the loop 3 in the forward direction and therefore does not break the data. Further, the combination extraction unit 16b determines that the loop 1 and the loop 5 are not combinable because these loops have the different initial values.

Next, the loop 2 is used as the trigger. The combination extraction unit 16b determines that the loop 2 and the loop 3 are not combinable because these loops have the different initial values. Subsequently, the combination extraction unit 16b determines that the loop 2 and the loop 4 are not combinable because the loops have the different initial value. Further, the combination extraction unit 16b determines that the loop 2 and the loop 5 are combinable because these loops have the same initial value, final value, incremental value, and the loop 5 does not depend on the data of the loop 4 and does not break the dependency.

Next, the loop 3 is used as the trigger. The combination extraction unit 16b determines that the loop 3 and the loop 4 are combinable because the loops have the same initial value, final value and incremental value, and C(j) and C(j+1) are dependent in the forward direction. Further, the combination extraction unit 16b determines that the loop 3 and the loop 5 are not combinable because the loops have the different initial values. Next, the loop 4 is used as the trigger. The combination extraction unit 16b determines that the loop 4 and the loop 5 are not combinable because the loops have the different initial value.

The combinations thus extracted are illustrated in FIG. 10. FIG. 10 is a diagram illustrating an example of a loop fusion target list. As illustrated in FIG. 10, the combination extraction unit 16b identifies that "the loop 1" can be fused with "the loop 3, the loop 4", "the loop 2" can be fused with "the loop 5", and "the loop 3" can be fused with "the loop 4". Note that the table in FIG. 10 can be created by the combination extraction unit 16b in an internal memory or a temporary area.

Figure 11:
FIG. 11 is a diagram illustrating examples of created loop fusion determination list.

Subsequently, the combination extraction unit 16b creates a loop fusion determination list illustrated in FIG. 11 based on the results of the extracted combinations. FIG. 11 is a diagram illustrating examples of the created loop fusion determination list. As illustrated in FIG. 11, the combination extraction unit 16b creates the combinations of "the loop 1, the loop 3", "the loop 1, the loop 4", "the loop 1, the loop 3, the loop 4", "the loop 2, the loop 5", and "the loop 3, the loop 4" as the virtual loops. Further, the combination extraction unit 16b creates a loop determination list, correlating each of the virtual loops with the areas where the "number of data transfers, number of floating-point operations, B/F value, number of instructions and number of streams" are stored. Note that the loop determination list illustrated in FIG. 11 may be created in the internal memory or the temporary area by the combination extraction unit 16b.

Extracting Information

Next, an example of extracting the "number of data transfers, number of floating-point operations, B/F value, number of instruction and number of streams" from each of the virtual loops will be described. FIG. 12 is a diagram illustrating count target examples of various kinds of data. Now, a description will be given by exemplifying the intermediate language and the virtual loop of the loop 1 and the loop 3 illustrated in FIG. 12. Note that the memory is written as mem in FIG. 12. According to the codes described in the intermediate language illustrated in FIG. 12, a memory 1 to a memory 3 indicate accessing a four-byte area in each access, and a memory 4 to a memory 8 indicate accessing an eight-byte area in each access.

Extracting Information: Number of Instructions

First, extracting the number of instructions will be described. The information extraction unit 16c counts the number of instructions executed in each of the loop 1 and the loop 3. In FIG. 12, as for the loop 1, the information extraction unit 16c detects six LOAD instructions, two MULT instructions, three ADD instructions, and two STORE instructions, and extracts the number of instructions for the loop 1 as "13". In the same manner, the information extraction unit 16c extracts the number of instructions for the loop 3 as "338". As a result, the information extraction unit 16c calculates that the number of instructions of the virtual loop including the loop 1 and the loop 3 as "13+338=351", and stores this number of instructions in the loop determination list.

Extracting Information: Number of Floating-Point Operations

Next, extracting the number of floating-point operations will be described. The information extraction unit 16c counts, for each of the loop 1 and the loop 3, the number of floating-point operations based on the respective instructions executed in each of the loops. In FIG. 12, as for the loop 1, the information extraction unit 16c detects two MULT instructions and three ADD instructions as the floating-point operations, and extracts the number of floating-point operations for the loop 1 as "5". In the same manner, the information extraction unit 16c extracts the number of floating-point operations for the loop 3 as "151". As a result, the information extraction unit 16c calculates the number of floating-point operations for the virtual loop including the loop 1 and the loop 3 as "5+151=156", and stores this value in the loop determination list.

Extracting Information: Number of Streams

Figures 13, 14:
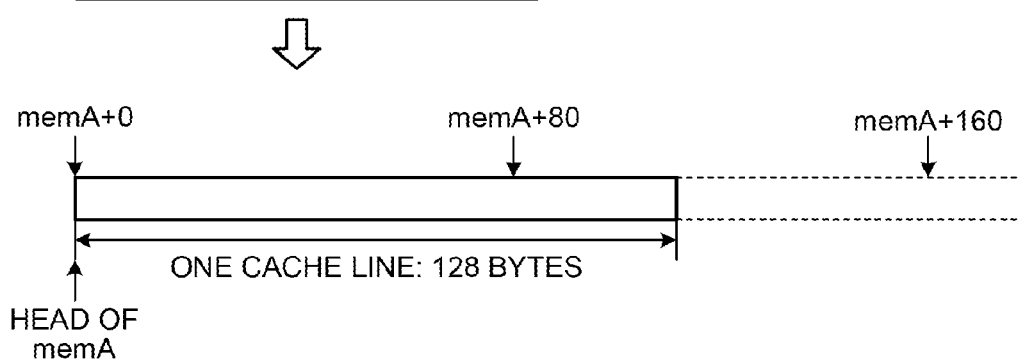
FIG. 13 is a diagram for describing a same stream by exemplifying a source code.
FIG. 14 is a diagram for describing the same stream by exemplifying an intermediate language.

Next, extracting the number of streams will be described. Here, a concept of the same stream will be described. FIG. 13 is a diagram for describing the same stream by exemplifying a source code. Consideration is given to a distance in each array, assuming that A(i) is a reference (0). A(i+10) indicates 10 away from the reference and a target memory access is eight bytes. Therefore, A(i+10) accesses an area 80 bytes away from A(i). Here, provided that one cache line is 128 bytes, the area 80 bytes away from A(i) can be determined to be on the same cache line. On the other hand, A(i+20) indicates 20 away from the reference and the target memory access is eight bytes. Therefore, A(i+20) accesses the area 160 bytes away from A(i). Accordingly, since the area that A(i+20) accesses is not on the same cache line as A(i), it is determined that A(i+20) is not on the same stream and the access of A(i+20) is counted as the number of data accesses, i.e., the number of data transfers.

FIG. 14 is a diagram for describing the same stream by exemplifying an intermediate language. In the case of FIG. 14, a case 1) accesses a head of memA, and a case 2) accesses 80 bytes away from the head. Further, a case 3) accesses 160 bytes away from the head. Now, provided that one cache line is 128 bytes, the cases 1) and 2) are regarded as the same stream because both access the same stream. However, the case 3) is not regarded as the same stream because the case 3) is not located on the cache line where the cases 1) and 2) access.

Extracting Information: Number of Data Transfers

Next, extracting the number of data transfers will be described. The information extraction unit 16c counts, for the loop 1 and the loop 3, the number of times that each of the instructions accesses. As for the loop 1, the information extraction unit 16c extracts the LOAD instruction for each of mem01 to mem06. Here, accessing mem01 to mem03 is executed in four-byte units, and accessing mem04 to mem08 is executed in eight-byte units. As a result, the information extraction unit 16c calculates the number of accesses of the LOAD instruction as "4 (mem01)+4 (mem02)+4 (mem03)+8 (mem04)+8 (mem05)+8 (mem06)=36".

Additionally, the information extraction unit 16c extracts the STORE instructions for mem07 and mem08. Here, accessing mem07 and mem08 is executed in eight-byte units. Further, note that the number of data transfers is twice because the STORE instructions are stored in the area where the STORE instructions have been loaded. As a result thereof, the information extraction unit 16c calculates the number of accesses of the STORE instruction as "2×8 (mem07)+2×8 (mem08)=32".

Therefore, the information extraction unit 16c calculates the number of data transfers for the loop 1 as next: the LOAD instruction "36" bytes+STORE instruction "32"="68". In the same manner, the information extraction unit 16c calculates the number of data transfers for the loop 3 as "10". As a result thereof, the information extraction unit 16c calculates the number of data transfers of the virtual loop including the loop 1 and the loop 3 as "68+10=78", and stores the value in the loop determination list.

Calculating B/F Value

Figure 15:
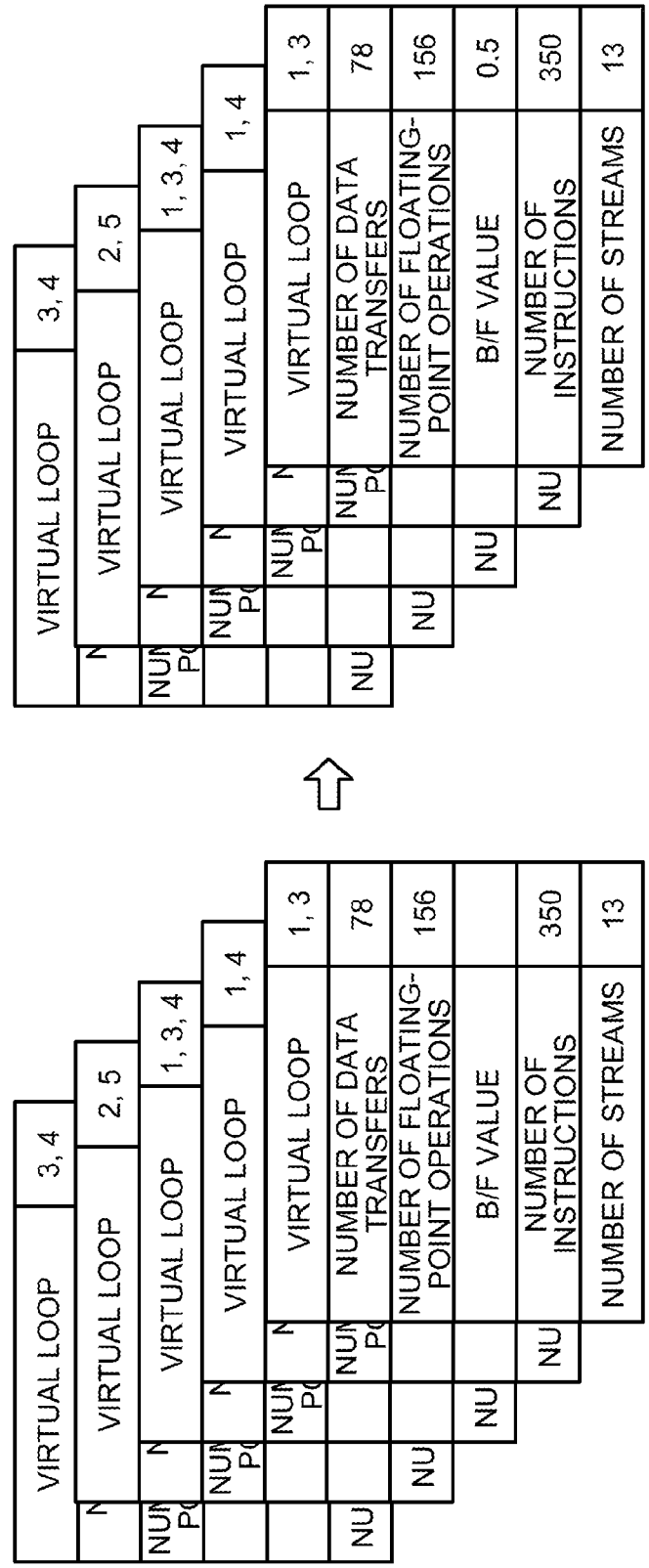
FIG. 15 is a diagram illustrating exemplary calculation of the B/F value.

Next, calculation of the B/F value will be described. FIG. 15 is a diagram illustrating exemplary calculation of the B/F value. As illustrated in FIG. 15, the ratio calculation unit 16d calculates the B/F value for the loop 1 and the loop 3, using the above-described number of floating-point operations and the number of data transfers. For instance, the ratio calculation unit 16d calculates the B/F value as "0.5" by dividing the number of data transfers "78" extracted by the information extraction unit 16c by the number of floating-point operations "156" extracted by the information extraction unit 16c. Then, the ratio calculation unit 16d stores the B/F value "0.5" of the virtual loop including the loop 1 and the loop 3 in the loop determination list.

Determining Executability of Loop Fusion

Next, a description will be given for an example of determining executability of the loop fusion, using the results generated by the information extraction unit 16c and the ratio calculation unit 16d. FIG. 16 is a diagram for describing determination on executablity of the loop fusion. As illustrated in FIG. 16, it is assumed that the information extraction unit 16c and the ratio calculation unit 16d generate "78, 156, 0.5, 350, 13" as the "number of data transfers, number of floating-point operations, B/F value, number of instructions, number of streams" for the virtual loop "1, 3".

In the same way, it is assumed that the information extraction unit 16c and the ratio calculation unit 16d generate "78, 130, 0.6, 450, 13" as the "number of data transfers, number of floating-point operations, B/F value, number of instructions, number of streams" for the virtual loop "1, 4".

Further, it is assumed that the information extraction unit 16c and the ratio calculation unit 16d generate "83, 281, 0.295, 550, 15" as the "number of data transfers, number of floating-point operations, B/F value, number of instructions, number of streams" for the virtual loop "1, 3, 4".

Also, it is assumed that the information extraction unit 16c and the ratio calculation unit 16d generate "15, 276, 0.054, 350, 13", as the "number of data transfers, number of floating-point operations, B/F value, number of instructions, number of streams" for the virtual loop "3, 4".

Further, it is assumed that the information extraction unit 16c and the ratio calculation unit 16d generate "24, 145, 0.165, 540, 10" as the "number of data transfers, number of floating-point operations, B/F value, number of instructions, number of streams" for the virtual loop "2, 5".

In this case, the determination unit 16e extracts the virtual loop "1, 3" and the virtual loop "1, 4" as the virtual loops that have thresholds corresponding to the B/F value "0.25<B/F value<0.75". The determination unit 16e determines that the loop fusion is not executable for rest of the virtual loops.

Then, the determination unit 16e selects the virtual loop "1, 3" having the B/F value closer to the center of the threshold range because the B/F value of the virtual loop "1, 3" is "0.5" and the B/F value of the virtual loop "1, 4" is "0.6".

Subsequently, the determination unit 16e exempts the virtual loop including the loop 1 or the loop 3 that has been determined as the fusing target from the fusing target. More specifically, the determination unit 16e exempts, from the fusing target, the virtual loop "1, 4" that has been extracted for having the B/F value within the threshold. Thus, the determination unit 16e determines that the virtual loop "1, 3", namely the loop 1 and the loop 3, as the fusing target. The fusion unit 16f fuses the loop 1 to loop 3 thereafter.

Incidentally, in the case where the number of instructions or the number of streams exceeds the threshold, the determination unit 16e may determine to exempt the virtual loop determined as the fusing target from the fusing target. As a result, it is possible to reduce fusing of the loops containing a large number of instructions and fusing of the loops causing inefficient memory access. Therefore, deterioration of execution performance caused by the loop fusion can be avoided.

As described above, at the time of determining executability of the fusion of loop processing for the plurality of the loops included in a code to be processed, the information processor 10 calculates the ratio of the operands to the number of data accesses after the fusion. The information processor 10 determines that loop fusion is executable when it is clear that usability of the system is improved, thereby achieving the effective loop fusion.

In other words, the information processor 10 calculates the B/F value by using the number of floating-point operations and the number of data transfers. Then, the information processor 10 makes groups of the loops fully utilizing arithmetic performance of the processor and fully using the memory bandwidth based on the calculated B/F value. After that, the information processor 10 may improve the execution performance by fusing the grouped loops.

As a result, the information processor 10 can reduce the fusion between the loops having the data accesses more than the operands as well as the fusion between the loops having the operands more than the data accesses. Therefore, data access latency and arithmetic processing latency after the loops becoming valid can be reduced, thereby achieving the effective loop fusion.

[b] Second Embodiment

While the embodiment of the present invention has been described above, the embodiments are not limited thereto and various modifications may be made besides the above-described embodiment. Accordingly, a different embodiment will be described below.

Target Program

According to a first embodiment, an example of extracting various kinds of data for determining executability of the loop fusion from an intermediate language has been described, but the embodiment is not limited to thereto. For instance, the data may be extracted from a source program 11a, and a virtual loop may be identified by using the source program 11a, and the data may be extracted using an intermediate language 11b.

Operand

According to the first embodiment, MULT and ADD are exemplified as floating-point operations, but the floating-point operations are not limited to thereto. For instance, processing can be executed even with a SUB instruction or a DIV instruction. Additionally, according to the first embodiment, an example in which operands and number of data transfers are calculated after generation of virtual loops has been described. However, the embodiment is not limited thereto, and the virtual loops may be generated after calculating the operands and the number of data transfers.

Optimization

According to the first embodiment, an example has been described, in which the loop fusion is executed as an example of optimization. However, there is other optimizing process other than the above-described loop fusion.

Hardware

Figure 17:
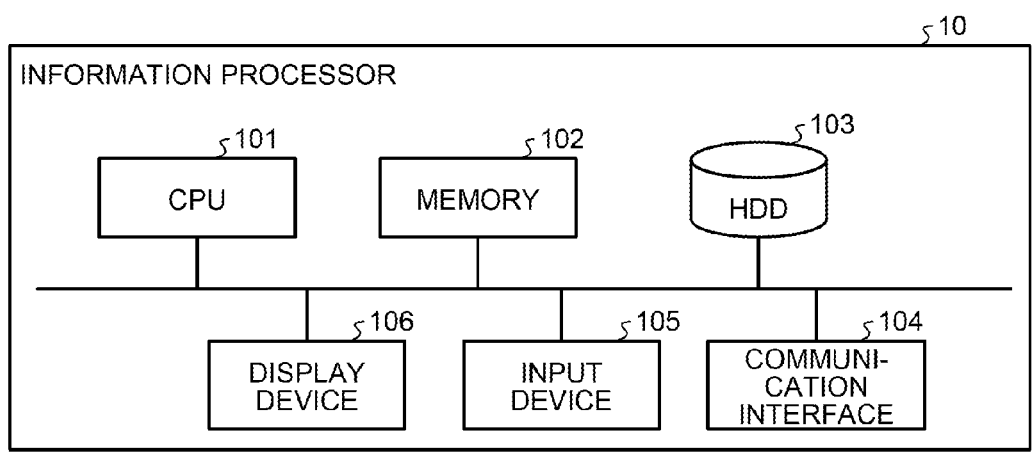
FIG. 17 is a diagram illustrating an exemplary configuration of hardware of the information processor.

FIG. 17 is a diagram illustrating an exemplary configuration of hardware of an information processor. As illustrated in FIG. 17, an information processor 10 includes a Central Processing Unit (CPU) 101, a memory 102, a Hard Disk Drive (HDD) 103, a communication interface 104, an input device 105, and a display device 106.

The HDD 103 stores a program and respective DB for operating functions illustrated in FIG. 1. The HDD 103 is an example of a recording medium, but it is also possible to store various kinds of programs in a computer-readable storage medium, such as a Read Only Memory (ROM), a RAM and a CD-ROM disk, so that a computer can read the programs. Meanwhile, the storage medium may be disposed in a remote place, and the programs can be obtained and used by accessing the recording medium with the computer. Further, in this case, the obtained programs can be stored in a recording medium of the computer itself.

An example of the communication interface 104 is a network interface card. An example of the input device 105 is a key board, and the display device 106 is a display device for displaying various kinds of information, such as a touch panel and a display device.

The CPU 101 performs a process to execute respective functions described in FIG. 2 by reading out, from the HDD 103 and the like, the program for executing the process same as that executed in the respective processing units illustrated in FIG. 1 and developing the program on the memory 102. In other words, the process executes the functions same as those of the respective processing included in the information processor 10. More specifically, the CPU 101 reads out, from the HDD 103 and the like, the program having the same functions as those of the respective processing units included in the compiler execution unit 12. Further, the CPU 101 executes the process which executes the processing same as those of the respective processing units.

Thus, the information processor 10 operates as the information processor that performs a compiling method by reading and executing the program. Also, the information processor 10 reads out the above program from the recording medium via a medium reading device, and the functions same as the above-described embodiment can be executed by executing the mentioned program that has been read out. Note that execution of the program is not limited to the information processor 10 according to this embodiment. For instance, when a computer or a server executes the program, or both the computer and the server cooperatively execute the program, the present invention is also applicable in the same manner.

System

Additionally, among the respective processing described in this embodiment, an entire or any part of the processing that has been described to be automatically performed may be performed manually as well. Or, an entire or any part of the processing that has been described to be performed manually may be performed automatically by adopting a known method as well. Moreover, the processing procedure, controlling procedure, concrete names, and information including various kinds of data and parameters described in the above description and drawings may be suitably modified unless otherwise specified.

Also, the respective components in the respective units are illustrated in view of functional concept and therefore physically, not necessarily configured as illustrated in the drawings. In other words, specific forms, such as to separate or integrate the respective units, are not limited to those illustrated in the drawings. In other words, an entire or any part of the devices may be configured by physically or functionally separated or integrated in an optional unit depending on variety of loads, use condition, and so on. Furthermore, an entire or any part of the respective processing functions performed in the respective units may be implemented by a CPU and programs analyzed and executed by the CPU, or implemented as hardware by wired logic.

According to the embodiments, effective loop fusion is executable.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a compile controlling program causing a computer to execute a compile process comprising:
    determining executability of loop fusion, for each of a plurality of loop processes existing in a code to be processed, based on whether a value which is calculated by dividing total number of data transfers inside a virtual loop which are acquired by the loop fusion by total number of operands inside the virtual loop is within a predetermined range, the predetermined range decided based on an ideal value which is calculated using number of processors of a system which executes the code to be processed and a throughput of memory of the system, and
    executing fusion of loop processes with respect to combination of the loop processes having the value which is within the predetermined range.

2. The computer-readable recording medium according to claim 1, wherein the compile process further comprises deciding target combinations for executing fusion of the loop processing based on loop conditions of each of the plurality of loops existing in the code to be processed, and
    wherein the determining including determining executability of loop fusion for each of the combinations determined as the target combinations.

3. The computer-readable recording medium according to claim 2, wherein
    the determining includes determining executability of loop fusion, using number of instructions which are acquired by the loop fusion or number of the cache lines of a memory which each of the combined loops accesses.

4. The computer-readable recording medium according to claim 2, wherein the executing includes executing, for the plurality of combinations which are determined to be executable of the loop fusion and exist in a same loop, fusion of the loop processing is performed to fuse the loops of the combination which has a minimum difference between the value and the ideal value.

5. A compiling method comprising:
determining executability of loop fusion, for each of a plurality of loop processes existing in a code to be processed, based on whether a value which is calculated by dividing total number of data transfers inside a virtual loop which are acquired by the loop fusion by total number of operands inside the virtual loop is within a predetermined range, the predetermined range decided based on an ideal value which is calculated using number of processors of a system which executes the code to be processed and a throughput of memory of the system, and
executing fusion of loop processes with respect to combination of the loop processes having the value which is within the predetermined range.

6. An information processing apparatus comprising:
a memory, and
a processor connected to the memory wherein the processor executes a process comprising:
determining executability of loop fusion, for each of a plurality of loop processes existing in a code to be processed, based on whether a value which is calculated by dividing total number of data transfers inside a virtual loop which are acquired by the loop fusion by total number of operands inside the virtual loop is within a predetermined range, the predetermined range decided based on an ideal value which is calculated using number of processors of a system which executes the code to be processed and a throughput of memory of the system, and
executing fusion of loop processes with respect to combination of the loop processes having the value which is within the predetermined range.

\* \* \* \* \*